United States Patent [19]

Hood

[11] 4,330,914
[45] May 25, 1982

[54] BICYCLE WHEEL AND BRAKE ASSEMBLY

[75] Inventor: Edwin E. Hood, South Bend, Ind.

[73] Assignee: The Bendix Corporation, Southfield, Mich.

[21] Appl. No.: 60,086

[22] Filed: Jul. 24, 1979

[51] Int. Cl.³ .................. B21K 1/28; B23P 19/04; B60B 3/06; B60B 5/02
[52] U.S. Cl. .................. 29/159.01; 29/432; 301/63 PW; 301/65; 301/105 R; 403/282
[58] Field of Search .......... 29/159 R, 159.01, 159.1, 29/159.3, 432; 301/105 R, 105 B, 105 S, 63 PW, 65; 407/13, 16, 17; 409/253; 192/6 A, 6 B, 6 R; 403/479–482

[56] References Cited

U.S. PATENT DOCUMENTS

| 988,154 | 3/1911 | Thiemer | 407/16 |
|---|---|---|---|
| 1,157,666 | 10/1915 | Bennett | 29/432 X |
| 2,127,969 | 8/1938 | Dingwerth | 29/159.3 X |
| 2,357,188 | 8/1944 | English | 301/105 B UX |
| 2,544,304 | 3/1951 | Eckenbeck et al. | 403/282 X |
| 2,636,254 | 4/1953 | Gunning | 29/432 X |
| 2,651,102 | 9/1953 | Jespersen | 407/13 |
| 2,940,781 | 6/1960 | Erikson | 301/63 PW |
| 2,994,540 | 8/1961 | Carlson et al. | 301/105 B UX |
| 3,399,910 | 9/1968 | Fawkes | 403/282 |
| 3,645,580 | 2/1972 | Spies | 301/105 B X |
| 4,118,134 | 10/1978 | Mansel | 29/432 X |
| 4,226,454 | 10/1980 | Tranberg et al. | 403/282 X |
| 4,280,736 | 7/1981 | Raudmann | 301/65 X |

FOREIGN PATENT DOCUMENTS

| 824234 | 2/1938 | France | 301/65 |
|---|---|---|---|
| 196171 | 4/1923 | United Kingdom | 29/159.3 |
| 1506739 | 4/1978 | United Kingdom | 29/159.3 |

Primary Examiner—Lowell A. Larson
Attorney, Agent, or Firm—Leo H. McCormick, Jr.; Ken C. Decker

[57] ABSTRACT

A method of manufacturing a molded wheel and brake assembly. The molded wheel has a housing or hub with an axial bore therein with a first diameter and a smaller second diameter. The surface of the second diameter is finished in order to establish concentricity between that portion of the axial bore and the peripheral surface of the wheel. A cylindrical member is machined to establish a guide section separated from a knurled section by a relieved section on the peripheral surface thereof between a first end and a second end. The first end is positioned in the first diameter of the axial bore and a force applied to move the cylindrical member in the axial bore. The guide surface engages the second diameter to align the knurled section in the axial bore. On further movement of the cylindrical member, the knurled section broaches the hub to thereafter prevent rotative movement between a brake assembly located in the cylindrical member and the housing or hub.

14 Claims, 8 Drawing Figures

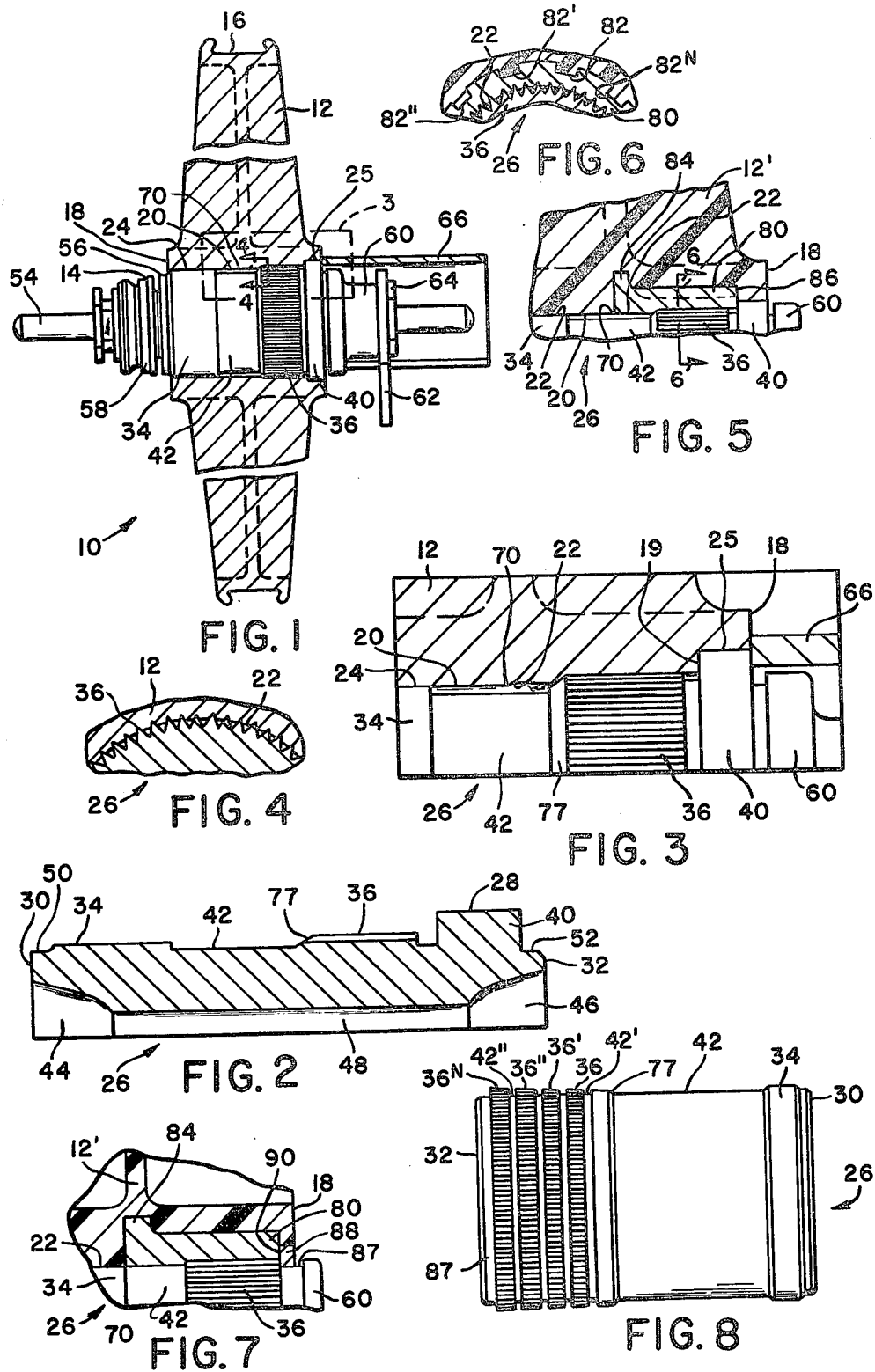

BICYCLE WHEEL AND BRAKE ASSEMBLY

BACKGROUND OF THE INVENTION

This invention relates to a process for making a die cast or molded wheel with a coaster brake assembly attached to a hub thereof.

Initially the hub of a bicycle brake assembly was cast as a cylindrical member with flanges on the ends thereof. A plurality of equally spaced holes were made in the flanges and spokes attached thereto to connect a rim to the hub to make a wheel. Later in an effort to conserve material it was suggested that the flanges could be made independently of the cylindrical member and attached thereto in a manner taught by the disclosure in U.S. Pat. No. 3,082,042. This type of attachment of a hub to a rim through a plurality of individual spokes to produce a bicycle wheel has been the standard for the industry. However, recently die cast or molded wheels have been made available for use in bicycles. These wheels are generally made of aluminum or plastic and as such can be manufactured with less labor cost since the spokes are integral with the hub and rim. Unfortunately, when a brake assembly is secured to the hub of such die casts or molded wheels, either the bearings in the brake assembly or the structural material of the hub is damaged as the brake assembly is forced into the axial bore of the hub.

SUMMARY OF THE INVENTION

I have devised a process for manufacturing a wheel with a brake assembly attached thereto which eliminates damage to the bearings during assembly and reduces the possibility of stress failure in the hub of the wheel on insertion of the assembled brake in the hub.

In my process, an axial bore in the hub of a molded or cast wheel has at least a portion thereof machined to be concentric with the peripheral surface of the wheel. Thereafter, a cylindrical housing for the brake assembly is cut from bar stock such that the length between a first end and a second end is substantially equal to the hub in the wheel. A guide surface having a predetermined dimensional tolerance with respect to the concentric portion of the axial bore in the hub is machined onto the peripheral surface on the cylindrical housing adjacent a first end. A knurled surface is machined onto the peripheral surface adjacent the second end of the cylindrical housing. A relieved surface is located between the guide surface and the knurled surface and a flange is provided between the knurled surface and the second end. The first end of the cylindrical housing is located in the axial bore of the housing and brought into the concentrically machined surface by a force acting on the flange. Thereafter, the knurled surface is brought into engagement with the hub and material broached from the wheel to prevent relative rotational movement of the hub and the cylindrical housing. Material removed from the hub during broaching is retained in the relieved surface to reduce the possiblity of overstressing the hub on movement of the first end of the cylindrical housing through the axial bore. When the flange engages the hub, the cylindrical housing is positioned in the hub to establish an operational wheel with a brake assembly attached thereto.

It is an advantageous effect of this invention to provide a process for making and attaching a brake assembly to a molded or cast wheel without fracturing or damaging either the hub of the wheel or bearings in the brake assembly.

It is another advantageous effect of this invention to provide a process of molding a plastic wheel with a metallic insert in the hub thereof in which a housing of an assembled brake member is attached.

It is a still further advantageous effect of this invention to provide a process for assemblying a brake member in a hub whereby the force needed to broach material from the hub is carried through a flange on the housing of the brake member.

These and other objects should be apparent from reading this specification and viewing the drawing.

BRIEF DESCRIPTION OF THE DRAWING

FIG. 1 is a secional view of a wheel and brake assembly made according to the process disclosed by this invention;

FIG. 2 is a sectional view of the cylindrical housing for the brake assembly;

FIG. 3 is a sectional view of the circumscribed section 3 in FIG. 1;

FIG. 4 is a sectional view taken along line 4—4 of FIG. 1;

FIG. 5 is a sectional view of a section of a hub of plastic wheel having a metal insert therein to which a brake assembly is secured;

FIG. 6 is a sectional view taken along lines 6—6 of FIG. 5;

FIG. 7 is a sectional view of a hub of a plastic wheel having a metal insert therein to which a brake assembly is secured therein by a washer or fastener attached to the metal insert; and FIG. 8 is a side view of a cylindrical housing for the brake assembly having a plurality of knurled surfces thereon for broaching material from a wheel to prevent relative rotational movement between the brake assembly and a wheel.

DETAILED DESCRIPTION OF THE INVENTION

The wheel and brake assembly 10 shown in FIG. 1 is made up of a wheel 12 which is either die cast or injected molded as a unitary structure and an assembled coaster brake 14 of the type fully disclosed in U.S. Pat. No. 3,252,551.

The wheel has a rim 16 formed on the peripheral surface and a hub or housing 18 with an axial bore 20 therethrough. The axial bore 20 has a first diameter 22 and a smaller second diameter 24. The second diameter 24 is machined such that it is concentric to the rim 16. The hub 18 has an annular groove 25 machined adjacent the first diameter 22 of axial bore 20.

The brake assembly 14 has a housing 26, as best shown in FIG. 2, which is cut from a supply of cylindrical bar stock. The bar stock initially has a peripheral surface with an outside diameter 28 and a length from a first end 30 to a second end 32 which is substantially equal to the axial bore 20 through the hub 18 of the wheel 12. The peripheral surface 28 on the cylindrical housing 26 is machined such that a guide surface 34 is produced adjacent end 30 and a knurled surface 36 is produced adjacent a flange 40 adjacent the second end 32. A relieved surface 42 is thereafter machined between the guide surface 34 and the knurled surface 36 and bearing races 44 and 46 are machined between the first and second ends 30 and 32, respectively, on the inner diameter 48 of the cylindrical housing 26. A pilot surface 50 is machined between guide surface 34 and the first end 30 and a sealing surface 52 is machined between the second end 32 and flange 40. The cylindrical housing 26 is thereafter hardened through a heat treat process to provide the structural integrity needed to withstand the internal forces generated during a brake application. After being hardened, the brake assembly 14 is placed in the cylindrical housing 26.

As shown in FIG. 1, the brake assembly 14 includes an axle 54, which is aligned in bore 48, a bearing retainer 56 which holds a first bearing in race 44, a drive screw 58 to which the sprocket is attached, a dust cap and bearing retainer 60 which holds a bearing in race 46 and surrounds sealing surface 52, and a brake reaction lever 62 which is fixed to the axle 54 by fastener 64.

METHOD OF ASSEMBLYING THE INVENTION

The wheel 12 and brake assembly 14 are typically manufactured at different locations, with the wheel 12 being produced at a foundary and the brake assembly 14 at a machine shop type operation. These individual components are then brought together at an assembly plant and combined through the following steps:

The first end 30 of the cylindrical housing 26 of the brake assembly 14 is placed in the first diameter 22 of the axial bore 20. A force is applied to flange 40 through a press member 66, shown in FIGS. 1 and 3, which moves the guide surface 34 through the first diameter 22. At about the mid-point 70 of the axial bore 20, pilot surface 50 aligns guide surface 34 with the second diameter 24 of the axial bore 20. Thereafter guide surface 34 and the second diameter 24 establish a light interference fit such that when the knurled surface 36, which later engages surface 19 on the hub 18, the knurled surface 36 is concentrically aligned with the axial bore 20 irrespective of the concentricity of the first diameter 22. The force from the press acts through the flange 40 causing the knurled surface 36 to broach material from the first diameter 22 to a depth, as shown in FIG. 4, to prevent rotational movement between the hub 18 and brake housing 26.

The sloping, tapered, or slanted surface 77 located between the relieved surface 42 and knurled surface 36 acts as a pilot in aligning the knurled surface 36 in the axial concentric center of bore 20. The depth of the individual teeth on the knurled surface 36 is selected such that if the first diameter 22 is exactly concentric to rim 16 only about one-half of the tooth depth cuts into the wheel 12 as shown in FIG. 4. However, if the first diameter 22 is eccentric due to some problem created by a worn die or mold, the guide surface 34 holds the knurled surface 36 in concentric alignment with rim 16 and thus some teeth on the knurled surface cut to the full depth of the teeth while other vary in their contribution to the broaching. As the force moves the cylindrical housing 26 of the brake assembly 14 into the axial bore 20, the material broached from the wheel 12 is moved ahead of the knurled surface 36 and deposited in the relieved surface 42 to prevent stressing of the material in the wheel which could cause a structural failure of its hub 18.

When the flange 40 engages surface 19, the brake assembly 14 is positioned centrally in the wheel hub 18.

Thus, with the guide surface 34 first engaging the machined second diameter 24 and tapered surface 77 guiding the knurled surface 36 into engagement with the first diameter 22, the axle 54 of the brake assembly 14 is positioned in a plane that is perpendicular to a radial plane through wheel 12 and parallel to rim 16. Since the tool 66 on the press never engages the dust cap and bearing retainer 60, the brake bearing assembly 14 is not damaged during the insertion into the axial bore 20.

When the wheel 12' is made of plastic through an injection molding process, the material in the axial bore 20 is usually not of sufficient resiliency to allow broaching without causing tearing of cracking thereof. Therefore, a metal insert or sleeve 80 as shown in FIG. 5 is located in the first diameter section 22. The metal insert or sleeve 80 is usually aluminum and as shown in FIG. 6, has a series of slots $82, 82' \ldots 82^N$ located on the peripheral surface thereof. The plastic flows into the slots $82, 82' \ldots 82^N$ and around the retaining ring 84 and end 86 to encapsulate the insert or sleeve 80 in the plastic wheel. The slots $82, 82' \ldots 82^N$ have a size as shown in FIG. 6, such that sufficient area is provided to prevent rotation of the brake assembly 14 in this relatively soft plastic material. The end of the retaining ring 84 is located along the radial center of hub 18 and forms the boundary between the first diameter 22 and the second diameter 24. The retaining ring 84 has sufficient area on the face thereof to prevent damage to the plastic wheel 12' during the broaching of the sleeve. This area is usually about 2–3 times the area of the sleeve. In this type of manufacture, it is not normally necessary to machine the second diameter 24 since the concentricity with the rim 16 is normally within set predetermined limits. On insertion of the cylindrical housing 26 in bore 20, the guide surface 34 engages the plastic second diameter 24 of wheel 12' and aligns the knurled surface 36 with the first diameter 22 in the metal or sleeve 80 insert in the same manner as when the wheel 12' is made entirely of metal.

In an effort to conserve the amount of metallic material that is machined from the cylindrical member 26, the outside diameter was selected such that the knurled surface 36 is the maximum outside of the bar stock as shown in FIG. 7. In this embodiment a surface 87 is machined on the peripheral surface. Thereafter, a washer 88 was placed on this surface 87 and brought into engagement with the knurled surface 36. Thereafter, the force from the press 66 is applied through the washer 88 into the cylindrical member 26 without effecting the bearing in the fully assembled brake 14. While this washer arrangement is shown in conjunction with the metal insert 80, it would equally be applicable with the full metal wheel 12 shown in FIG. 1.

In this arrangement, an epoxy glue or other suitable alloying material is located on surface 90 to fasten the washer 88 to the insert 80 and thereby retain the cylindrical member 26 in the hub 18 of the wheel 12'.

Normally the wheel 12 is made of die cast aluminum which has a Brinell number of 65 which translates in a Rockwell B hardness of 26. This material is relatively soft and therefore relatively easy to broach. However, when the wheel is made of some other material, it may be necessary to provide cylindrical member 26 with a plurality of knurled surfaces $36, 36' \ldots 36^N$ and relieved surfaces $42, 42' \ldots 42^N$ on the peripheral surface thereof as shown in FIG. 8 in order to broach the hub 18 without stressing the material in the wheel 12. When several knurled surfaces $36, 36' \ldots 36^N$ are provided, each section has a slightly smaller diameter than the adjacent knurled section starting with section $36^N$. Thus, each knurled section acts as a pilot for each succeeding section and thereby the insertion into the axial bore 20 is performed with less stress since each relieved section 42, 42' . . . 42$^N$ retains an amount of broached material substantially equal to the difference in the diameter of the adjacent knurled sections. In this type of arrangement, a washer 88 not shown on surface 87, in FIG. 8 is required in order to provide a surface through which the force is transmitted from the press into the cylindrical body 26 without going through the brake assembly 14.

Thus, the structure and process described above reduces the possiblity of structure failures when a brake assembling in assembly 14 is inserted in the axial bore 20 of a hub 18 in a die cast or molded wheel 12.

I claim:

1. A process for making a wheel having a housing for receiving an assembled brake comprising the steps of:
    casting a wheel having a housing with an axial bore therein, said axial bore having a first diameter section and a second diameter section;
    finishing the surface of said second diameter section to establish concentricity therebetween with the peripheral surface of the wheel;
    cutting a cylindrical member to an axial length between a first end and a second end that is substantially equal to the length of the axial bore through the wheel;
    machining a guide surface on the peripheral surface of said cylindrical member adjacent said first end, said guide surface having a predetermined dimensional tolerance with said first diameter section;
    machining a knurled surface on the periphery of said cylindrical member between a flange adjacent said second end and said guide surface;
    forming a relieved section on the peripheral surface of said cylindrical member between said guide surface and said knurled surface;
    forming a slanted section on the end of the knurled surface adjacent said relieved section;
    placing a brake assembly in said cylindrical member;
    aligning said cylindrical member with said axial bore;
    applying a force to said flange to move said guide surface through said first diameter section and into an interference engagement with said second section to concentrically position said knurled surface in said axial bore;
    moving said cylindrical member into said axial bore to bring said slanted section into engagement with said first diameter section to guide said knurled section into said first diameter;
    moving said cylindrical member further into said axial bore to bring said knurled section into engagement with said first diameter section;
    broaching said first diameter section with the knurled section on still further movement of the cylindrical member into said axial bore to prevent relative movement between the brake assembly and the wheel; and
    retaining material removed from said wheel in said first relieved section during broaching to reduce the possibility of overstressing the wheel on movement of the knurled section into the axial bore.

2. The process for making a wheel having a housing for receiving a brake assembly as recited in claim 1 further including the steps of:
    machining a first race on the interior of said cylindrical member adjacent said first end before placing the brake assembly in the cylindrical member, said force being applied through said flange to move said cylindrical member without effecting a bearing located in said first race in the brake assembly.

3. A process for making a wheel having an assembled brake fixed in a housing therein, comprising the steps of:
    molding a wheel with a housing having an axial bore therein;
    cutting a cylindrical member to an axial length between a first end and a second end substantially equal to the length of the axial bore in the housing of the wheel;
    machining a guide surface on the peripheral surface of the cylindrical member adjacent said first end;
    machining a knurled surface on the peripheral surface of the cylindrical member adjacent said second end;
    machining a relieved surface on the peripheral surface between said guide surface and said knurled surface;
    machining a slanted surface on the end of said knurled surface adjacent said relieved surface;
    locating a washer on the peripheral surface of the cylindrical member between the knurled surface and said second end;
    assembling a brake in said cylindrical member;
    placing the first end of the cylindrical member in the axial bore of the housing to establish an interference engagement between the axial bore and said guide surface on the cylindrical member;
    applying a force to said washer to move the cylindrical member in said axial bore to bring said slanted surface into engagement with said housing, said guide surface and slanted surface aligning said knurled surface with the axial bore; and
    applying still more force to said washer to further move the cylindrical member in said axial bore to broach the housing with the knurled surface and thereby prevent relative rotational movement between the cylindrical member and the housing, said relieved surface retaining any materials removed from the housing during broaching to reduce the possibility of overstressing the housing on movement of the knurled surface into the axial bore.

4. The process as recited in claim 3 further including the steps of:
    applying an adhesive material between said washer and housing to secure the cylindrical member in the housing.

5. A process for making a wheel having an assembled brake fixed in a housing therein, comprising the steps of:
    molding a wheel with housing having an axial bore therein;
    encapsulating an insert in said axial bore of the housing, said insert being of a different material than said housing;
    cutting a cylindrical member to an axial length between a first end and a second end substantially equal to the length of the axial bore in the housing of the wheel;
    machining a guide surface on the peripheral surface of the cylindrical member adjacent said first end;
    machining a knurled surface of the peripheral surface of the cylindrical member adjacent said second end;
    machining a relieved surface on the peripheral surface between said guide surface and said knurled surface;

locating a washer on the peripheral surface of the cylindrical member between the knurled surface and said second end;

assembling a brake in said cylindrical member;

placing the first end of the cylindrical member in the axial bore of the housing to establish an interference engagement between the axial bore and said guide surface on the cylindrical member;

applying a force to said washer to move the cylindrical member in said axial bore to bring said knurled surface into engagement with said insert, said guide surface aligning said knurled surface with the axial bore;

applying still more force to said washer to further move the cylindrical member in said axial bore to broach said insert with the knurled surface and thereby prevent relative rotational movement between the cylindrical member and the housing, said different material of said insert permitting said knurled surface to broach without structurally damaging the housing on insertion of the cylindrical member in the axial bore, said relieved surface retaining any materials removed from the housing during broaching to reduce the possibility of overstressing the housing on movement of the knurled surface into the axial bore; and applying an adhesive material between said washer and housing to secure the cylindrical member in the housing.

6. A method of locating and securing a housing of an assembled brake in an axial bore of a wheel, said housing having a peripheral surface with an annular guide section separated from a knurled section by a first relieved section, and a slanted section between the relieved section and the knurled section, said axial bore having a first diameter section separated from a smaller second diameter section, said second diameter being concentric to the peripheral surface of the wheel, comprising the steps of:

aligning said housing with said axial bore;

applying a force to said housing to move said guide section through said first diameter section and into an interference engagement with said second section to concentrically position said knurled section in said axial bore;

moving said housing further into said axial bore to bring said slanted section into engagement with said first diameter section to assist in concentrically positioning the knurled section in the axial bore;

moving said housing further into said axial bore to bring said knurled section into engagement with said first diameter section;

broaching said first diameter section with the knurled section on still further movement of the housing into the axial bore to prevent relative movement between the housing of the assembled brake and the wheel; and retaining materials removed from said wheel in said first relieved section during broaching to reduce the possibility of overstressing the wheel on movement of the knurled section into the axial bore.

7. A method of locating and securing a housing of an assembled brake in an axial bore of a wheel, said housing having a peripheral surface with an annular guide section separated from a knurled section by a first relieved section, said axial bore having a first diameter section separated from a smaller second diameter section, said second diameter being concentric to the peripheral surface of the wheel, comprising the steps of:

locating a sleeve in at least a portion of said first diameter section of the axial bore in the housing of the wheel, said sleeve being of a different material than said wheel and integrally fixed thereto;

aligning said housing with said axial bore;

applying a force to said housing to move said guide section through said first diameter section and into an interference engagement with said second section to concentrically position said knurled section in said axial bore;

moving said housing further into said axial bore to bring said knurled section into engagement with said first diameter section;

broaching said sleeve with the knurled section on still further movement of the housing into the axial bore to prevent relative movement between the housing of the assembled brake and the wheel; and retaining materials removed from said wheel in said first relieved section during broaching to reduce the possibility of overstressing the wheel on movement of the knurled section into the axial bore.

8. The method of locating and securing a housing of an assembled brake in an axial bore of a wheel, as recited in claim 7, further including:

establishing a second relieved section on said peripheral surface of said housing to provide additional storage space for material removed from the wheel by said broaching.

9. The method of locating and securing a housing of an assembled brake in an axial bore of a wheel as recited in claim 8, further including:

bringing a flange on said housing into engagement with said wheel to limit the movement of the assembled brake into the axial bore.

10. The method of locating and securing a housing of an assembled brake in an axial bore of a wheel, as recited in claim 7 further including the steps of:

locating a retaining ring on the end of said sleeve to provide sufficient area to resist the force of broaching without damaging the material in the wheel.

11. The method of locating and securing a housing of an assembled brake in an axial bore of a wheel, as recited in claim 7 further includes the step of:

establishing a flange on said peripheral section between the knurled section and the first end, said force being transmitted through said flange to move the housing, said flange engaging the wheel to limit the movement of the brake assembly into said axial bore.

12. The method of locating and securing a housing of an assembled brake in an axial bore of a wheel, as recited in claim 7 further including the step of:

placing a washer on the peripheral surface of said cylindrical member, said force being transmitted through said washer and into the knurled section to broach said first diameter section without effecting the assembled brake.

13. The method of locating and securing a housing of an assembled brake in an axial bore of a wheel, as recited in claim 12 further including the step of:

applying an adhesive material between said washer and wheel to secure said housing within said axial bore.

14. The process for making a wheel having a housing for receiving a brake assembly, as recited in claim 7 further including the steps of:

cutting a plurality of annular grooves in the knurled surface to provide for retention of any material removed from the sleeve and thereby reduce the possibility of structural failure of the housing through overstressing the material in the wheel.

* * * * *